United States Patent
Galles (10) Patent No.: US 11,288,226 B1
(45) Date of Patent: Mar. 29, 2022

(54) METHODS AND SYSTEMS FOR ADDRESS BASED TRANSACTION FILTERS FOR ON-CHIP COMMUNICATIONS FABRICS

(71) Applicant: Pensando Systems Inc., Milpitas, CA (US)

(72) Inventor: Michael Brian Galles, Los Altos, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/076,523

(22) Filed: Oct. 21, 2020

(51) Int. Cl.
*G06F 13/42* (2006.01)

(52) U.S. Cl.
CPC .. *G06F 13/4204* (2013.01); *G06F 2213/0004* (2013.01)

(58) Field of Classification Search
CPC ............... G06F 13/4204; G06F 2213/0004
See application file for complete search history.

(56) References Cited

U.S. PATENT DOCUMENTS

| | | | | |
|---|---|---|---|---|
| 6,148,323 A * | 11/2000 | Whitner | ............... | G06F 11/28 714/E11.178 |
| 9,864,701 B1 * | 1/2018 | Khan | ............... | G06F 13/102 |
| 10,091,079 B2 * | 10/2018 | Kniplitsch | ............... | G06F 21/86 |
| 2014/0281321 A1 * | 9/2014 | Carreno | ............... | G06F 12/1483 711/164 |
| 2015/0127993 A1 * | 5/2015 | Sankar | ............... | G06F 11/3636 714/45 |
| 2017/0371427 A1 * | 12/2017 | Billau | ............... | G06F 3/0346 |
| 2018/0253555 A1 * | 9/2018 | Schumacher | ............... | G06F 21/572 |

OTHER PUBLICATIONS

ARM, "AMBA® AXI™ and ACE™ Protocol Specification", 2013, 328 pgs.

* cited by examiner

*Primary Examiner* — Henry Tsai
*Assistant Examiner* — Christopher A Daley
(74) *Attorney, Agent, or Firm* — Loza & Loza LLP (57) ABSTRACT

A configurable transaction filtering and logging circuit for on-chip communications within a semiconductor chip can store filter patterns. The filter patterns can include an address range filter pattern. The circuit can monitor transactions carried by an on-chip connection fabric. The transactions can be configured to transfer data between a first core circuit and a second core circuit that are also implemented on the semiconductor chip. The circuit can execute one of a set of actions in response to detecting a transaction that matches one of the filter patterns. One of the actions can be logging the transaction to a transaction log buffer in response to detecting that the transaction matches one of the filter patterns.

20 Claims, 9 Drawing Sheets

| Transaction Filter Control Register | 401 |
|---|---|
| Enable (tracing on/off) | 402 |
| Log All (all requests, all responses) | 403 |
| Log All Response Errors | 405 |
| Buffer Wrap On (circular aspect on/off) | 406 |
| Reset (zeros index & generation) | 407 |
| Buffer Base Address | 408 |
| Buffer Size (e.g.: (2**size)*64 bytes) | 409 |
| Buffer Current Index (RO) | 410 |
| Ring Generation (num loops through buffer ring) | 411 |

FIG. 4

| Transaction Filter Freeze/Interrupt Register | 501 |
|---|---|
| Read Freeze (freeze NOC on read filter hit) | 502 |
| Write Freeze (freeze NOC on write filter hit) | 503 |
| Address That Caused Freeze | 504 |
| Unfreeze (NOC can continue operation) | 505 |
| Interrupt upon freezing NOC | 506 |
| Interrupt if filter hit and interrupts enabled | 507 |
| Interrupt on read response error | 508 |
| Interrupt on write response error | 509 |

FIG. 5

| Read Transaction Log Entry | 601 |
|---|---|
| Header ("Read Request") | 602 |
| ARID (Read Address ID) | 603 |
| Read Filter ID | 604 |
| ARLEN (Burst Length) | 605 |
| ARSIZE (Burst Size) | 606 |
| ARCACHE (Memory Type) | 607 |
| ARADDR (Read Address) | 608 |
| Timestamp (Global Clock Counter Value) | 609 |

METHODS AND SYSTEMS FOR ADDRESS BASED TRANSACTION FILTERS FOR ON-CHIP COMMUNICATIONS FABRICS

TECHNICAL FIELD

The embodiments relate to semiconductor chips, application specific semiconductor chips, network-on-a-chip technologies, on-chip communications fabrics, and observing transactions between components within an application specific integrated circuit.

BACKGROUND

Integrated systems designed for computing, networking, storage, and other tasks are often built around a transaction based, on-chip connection fabric. An example of such a fabric is the AXI (Advanced eXtensible Interface) bus which is an industry standard used in many designs to connect CPUs, DMA engines, domain specific processors, cryptography engines, data compression engines, IO bridges (e.g., PCIe), and other requestor functions to responder functions such as DDR memory, SRAM, caches, IO bridges, and device control registers. Integration of many diverse technology functions and the software which controls them is very complex and difficult to debug.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method for communications within a semiconductor chip. The method can include storing filter patterns including an address range filter pattern, and monitoring transactions carried by an on-chip connection fabric. The transactions can be configured to transfer data between a first core circuit and a second core circuit. The method can also include executing one of a set of actions in response to detecting a transaction that matches one of the filter patterns, and logging the transaction to a transaction log buffer in response to detecting that the transaction matches one of the filter patterns.

Another aspect of the subject matter described in this disclosure can be implemented in a semiconductor chip that includes an on-chip connection fabric, a first core circuit, a second core circuit, and a transaction filter circuit communicatively coupled to the first core circuit and the second core circuit via the on-chip connection fabric. The transaction filter circuit can be configured to store filter patterns, monitor transactions carried by the on-chip connection fabric, the transactions configured to transfer data between the first core circuit and the second core circuit, execute one of a set of actions in response to detecting a transaction that matches one of the filter patterns, and log a transaction to a transaction log buffer in response to detecting that the transaction matches one of the filter patterns.

Yet another aspect of the subject matter described in this disclosure can be implemented by a semiconductor chip comprising a first core circuit, a second core circuit, a means for communicating a transaction between the first core circuit and the second core circuit, a means for determining that the transaction meets a criterion, a means for executing a means for reacting to the transaction meeting the criterion, and a means for blocking the transaction only if and only if the means for reacting to the transaction meeting the criterion prevents passing the transaction.

In some implementations of the methods and devices, one of the filter patterns is a bit mask. In some implementations of the methods and devices, the set of actions include discarding the transaction and returning an error responsive to the transaction. In some implementations of the methods and devices, the on-chip communications fabric is configured to carry write transactions via a write address circuit, a write data circuit, and a write response circuit, and the on-chip communications fabric is configured to carry read transactions via a read address circuit and a read response circuit. In some implementations of the methods and devices, the set of actions include incrementing a transaction counter that is configured to be read via the on-chip communications fabric.

In some implementations of the methods and devices, the set of actions include interrupting a CPU. In some implementations of the methods and devices, the filter patterns include a master function Id filter pattern. In some implementations of the methods and devices, the filter patterns include a transaction attribute filter pattern. In some implementations of the methods and devices, the filter patterns include an error status filter pattern. In some implementations of the methods and devices, the filter patterns include an address range filter pattern. In some implementations of the methods and devices, the set of actions include logging the transaction to a transaction log buffer. In some implementations of the methods and devices, the set of actions include interrupting a CPU, and the set of actions include freezing a packet processing pipeline circuit.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Validating ASIC designs is difficult because latent software or hardware defects can remain hidden in highly complex designs. In many cases, the latent defect is revealed only when a specific state and sequence of instructions occur. Understanding the defect often involves recreating the conditions (state and instruction sequence) giving rise to an error. A complex ASIC, however, may be running numerous parallel operations at multi gigahertz speeds. As such, it can be extremely time consuming for a talented engineer to find the combination of conditions that reveal the defect. Debugging software running on ASICs is also difficult. The software can use many different hardware functions concurrently and many hardware functions do not provide easy visibility into the hardware's internal state. This complexity can make isolating and correcting a software bug slow and tedious.

To address these challenges, a set of transaction filter circuits can be implemented within the ASIC. An ASIC often includes a number of core circuits, sometimes called "IP cores" connected by an on-chip communications fabric such as an AXI (Advanced eXtensible Interface) bus. The IP cores may be custom designs or may be purchased or licensed from a library of IP cores that have been validated for a specific fabrication process that produces semiconductor chips. The transaction filter circuits can be implemented throughout the ASIC such that all, or a select group, of the core circuits can be monitored in real time. When a core circuit is suspected of having a latent defect, a transaction filter monitoring that core circuit can be enabled such that it can log transactions, freeze the communications fabric, interrupt a CPU or host computer, or take some other action when specific events occur. The specific events can include errors, transactions to specific addresses, etc. Locating a transaction filter between a core circuit and the on-chip communications fabric helps ensure that that particular core circuit is monitored well enough that latent errors within that core circuit can be quickly isolated and diagnosed. At each point where the transaction filters are implemented, detailed records of transaction requests and responses can be written to circular buffers in general purpose system memory. Even when there is no latent hardware defect, software can have bugs. For example, the ASIC's CPU cores execute software and the ASIC's packet processing pipelines can be configured via CPU executable software to run domain specific software (e.g. P4 executable code). Just as with hardware defects, the transaction filter circuits help locate software bugs by logging transactions into and out of the core circuits. Furthermore, as circuits implemented within the ASIC, the transaction filter circuits are available in every ASIC. The transaction filter circuits can be disabled in production systems shipped to customers, installed in data centers, etc. Those same transaction filter circuits can later be enabled by writing into transaction filter circuit control registers for on-site and in situ debugging.

The advantages of implementing transaction filter circuits within the ASIC include observability for system debug and statistics gathering. By providing fine grained visibility into the operation of each core circuit, the transaction filter circuits provide data leading to faster diagnosis and debugging of defects. Even when a defect is not suspected, visibility into specific transactions is instructive with respect to implementing functions via particular core circuits. Another advantage is that address based filters provide visibility into the transactions between core circuits. Such interactions between cores can surface latent defects. A further advantage is statistics gathering which can indicate parts of the ASIC that are underutilized, overutilized, bottlenecks, etc. Such statistics can indicate software changes for better utilizing the ASIC and can indicate directions for later generation chips. Yet another advantage is that the transaction filter circuits interface to the cores and the fabric using the common fabric interface (i.e., AXI). As such, the same transaction filter logic can be distributed uniformly across the ASIC. In essence, each transaction filter circuit is a hardware instantiation of the transaction filter logic. The transaction filter circuits, all using the common fabric interface can have a common time reference (a clock signal) thereby allowing asynchronous operations running in different logic cores to be correlated between different log entries.

Figure 1:
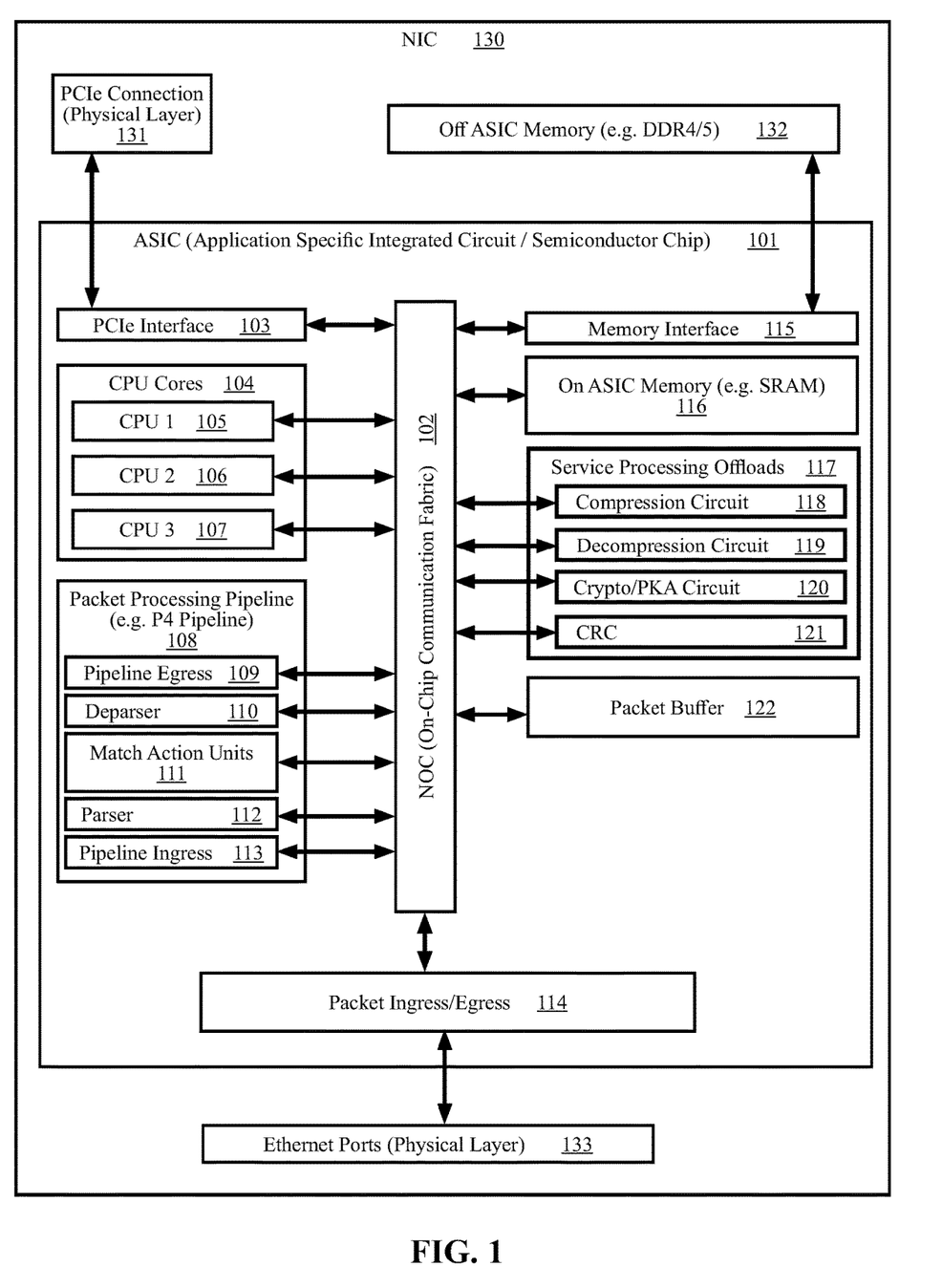
FIG. 1 is a functional block diagram of a NIC (network interface card) having an ASIC (application specific integrated circuit) in which aspects may be implemented.

FIG. 1 is a functional block diagram of a NIC (network interface card) 130 having an ASIC (application specific integrated circuit) 101 in which aspects may be implemented. The NIC 130 includes a PCIe connection 131, Off ASIC memory 132, and ethernet ports 133. The PCIe connection provides for installing the NIC in a host computer having a PCIe bus. The off ASIC memory 132 can be one of the widely available memory modules or chips such as DDR4 SDRAM (double data rate 4 synchronous dynamic random-access memory) such that the ASIC has access to many gigabytes of memory on the NIC 130. The ethernet ports 133 provide physical connectivity to a computer network such as the internet.

The ASIC 101 is a semiconductor chip having many core circuits interconnected by an on-chip communications fabric, sometimes called a NOC (network on a chip) 102. NOCs are often implementations of standardized communications fabrics such as the widely used AXI bus. The ASIC's core circuits can include a PCIe interface 103, CPU cores 104, packet processing pipeline 108 elements, memory interface 115, on ASIC memory (e.g. SRAM) 116. Service processing offloads 117, a packet buffer 122, and packet ingress/egress circuits 114. The PCIe interface 103 can be used to communicate with a host computer via the PCIe connection 131. The CPU cores 104 can include numerous CPU cores such as CPU 1 105, CPU 2 106, and CPU 3 107. The packet processing pipeline can include a pipeline ingress circuit 113, a parser circuit, match-action units 111, a deparser circuit 110, and a pipeline egress circuit 109. The service processing offloads 117 are circuits implementing functions that the ASIC uses so often that the designer has chosen to provide hardware for offloading those functions from the CPUs. The service processing offloads can include a compression circuit 118, decompression circuit 119, a crypto/PKA circuit 120, and a CRC calculation circuit 121. The specific core circuits implemented within the non-limiting example of ASIC 101 have been selected such that the ASIC implements many, perhaps all, of the functionality of a network appliance that processes network traffic flows carried by IP (internet protocol) packets.

The packet processing pipeline 108 is a specialized set of elements for processing network packets such as IP (internet protocol) packets. A P4 pipeline is an example of a packet processing pipeline that can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

Figure 2:
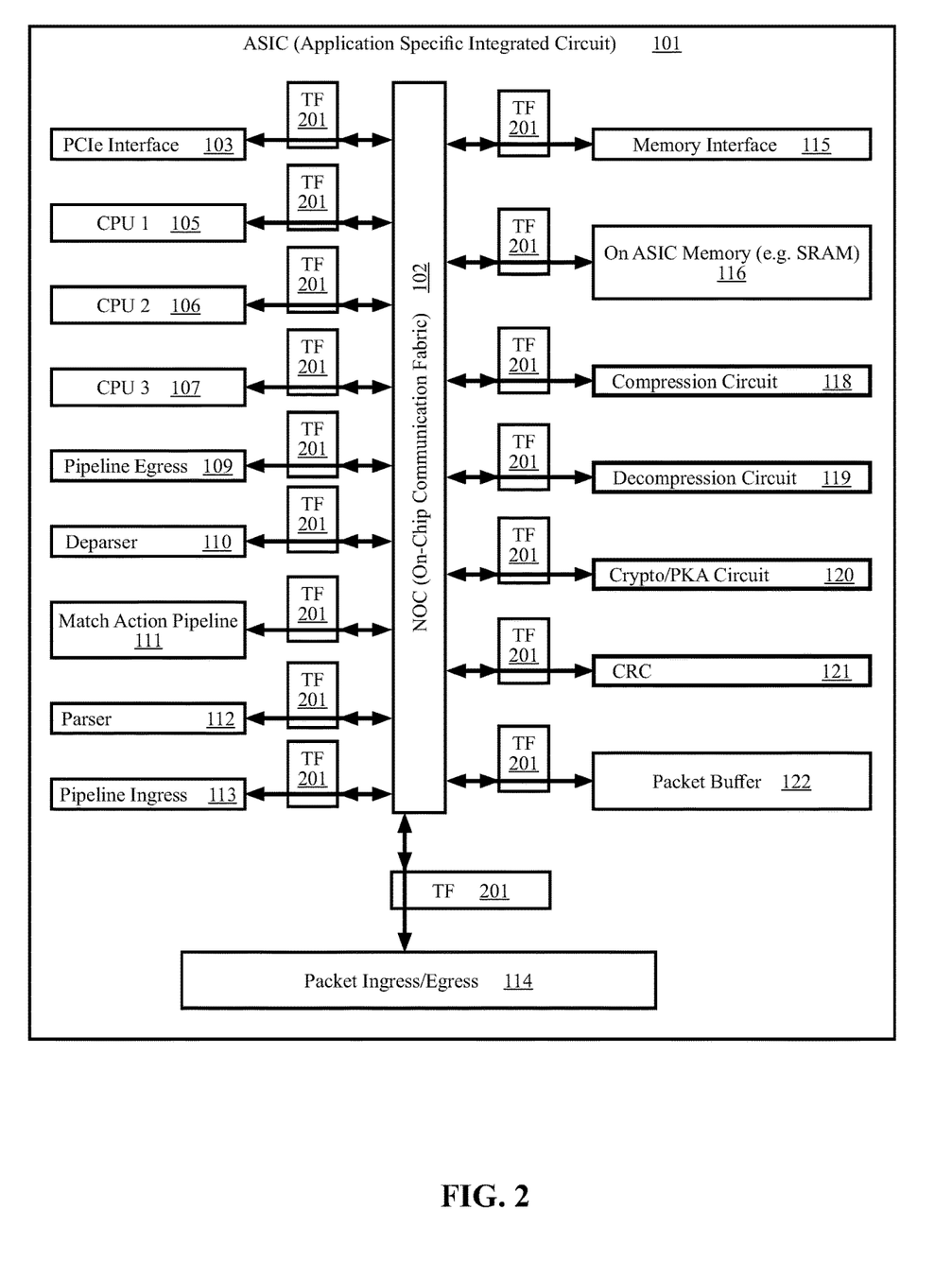
FIG. 2 is a high-level diagram illustrating an ASIC with transaction filter circuits according to some aspects.

FIG. 2 is a high-level diagram illustrating an ASIC 101 with transaction filter circuits according to some aspects. FIG. 1 showed the ASIC 101 on a NIC 130. FIG. 2 show the ASIC 101 with transaction filters circuits 201 between each core circuit and the NOC. Each transaction filter has an address at which it can be inspected and configured via the NOC 102. For example, the transaction filter between CPU 3 and the NOC 102 has an address that is different from that of the transaction filter between the parser 112 and the NOC 102. Each transaction filter has control registers, status registers, filter pattern storage, action fields, etc. that can be accessed via the NOC 102.

Figure 3:
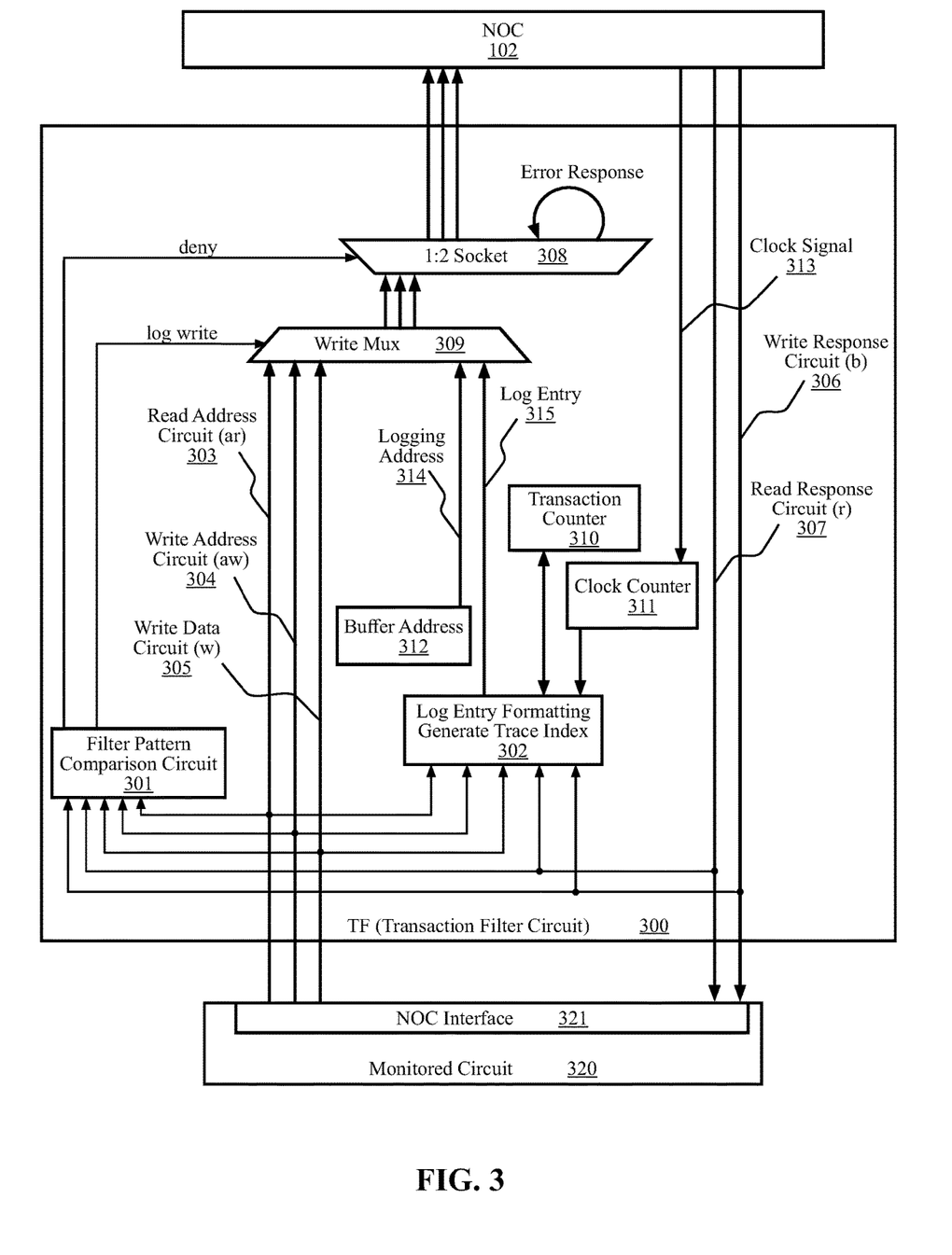
FIG. 3 is a functional block diagram of an exemplary transaction filter circuit according to some aspects.

FIG. 3 is a functional block diagram of an exemplary transaction filter circuit 300 according to some aspects. The transaction filter 300 is located between a monitored circuit 320 and the NOC 102. The monitored circuit can be any of the core circuits of FIGS. 1 and 2. The monitored circuit 320 has a NOC interface 321 that is configured for interfacing the monitored circuit 320 directly to the NOC 102. The transaction filter 300 is configured to be located between the NOC interface 321 and the NOC 102. As such the transaction filter circuit is ideally positioned for monitoring and sometimes altering/discarding the transactions passing through the NOC interface 321.

The transaction filter 300 is illustrated as monitoring an AXI bus. The non-limiting example of FIG. 3 can be adapted for use with other on-chip communications fabrics and different version of the AXI bus. An AXI bus is often viewed as having five channels: ar, aw, w, r, and b. The AXI bus channels and their specifications are described in the document "AMBI AXI and ACE Protocol Specification AXI3, AXI4, and AXI4-Lite ACE and ACE-Lite" published by ARM Holdings in 2013. The read address circuit 303 can carry the AXI ar channel. The write address circuit 304 can carry the AXI aw channel. The write data circuit 305 can carry the AXI w channel. The write response circuit 306 can carry the AXI b channel. The read response circuit 307 can carry the AXI r channel. The five channels can be compared to stored filter patterns by a filter pattern comparison circuit 301 that produces outputs such as deny and log write. Log write can control writing a log entry to a transaction log buffer via a write multiplexer 309 that can multiplex the ar, aw, and w channels from the NOC interface 321 and secondary aw and w channels carrying a log entry 315 (on w) and a logging address (on aw) provided by the transaction filter 300. A buffer address 312 can be a value held by or derived from the transaction filter's registers and supplied as the logging address 314. The log entry 315 can be provided by a log entry formatting circuit 302. The five channels can be input into the log entry formatting circuit 302. The log entry formatting circuit 302 can output log entries for every input it receives while the write multiplexer 309 controls whether the log entry 315 is written to the transaction log buffer. The log entry can include a transaction Id provided by a transaction counter 310 maintained by the transaction filter 300. The log entry can include a timestamp that is a value provided by a clock counter 311. ASICs or NOCs, such as AXI, can provide a clock signal 313. The clock counter 311 can count cycles of the clock signal (e.g. increment once per clock signal cycle). The clock counters 311 of the various transaction filters can have the same value when they all count based on the same clock signal or synchronized clock signals. A deny signal from the filter pattern comparison circuit 301 can control discarding a transaction from the monitored circuit 320 from reaching the NOC 102. When the transaction filter circuit 300 discards the transaction, it can also return an error to the monitored circuit.

Figure 4:
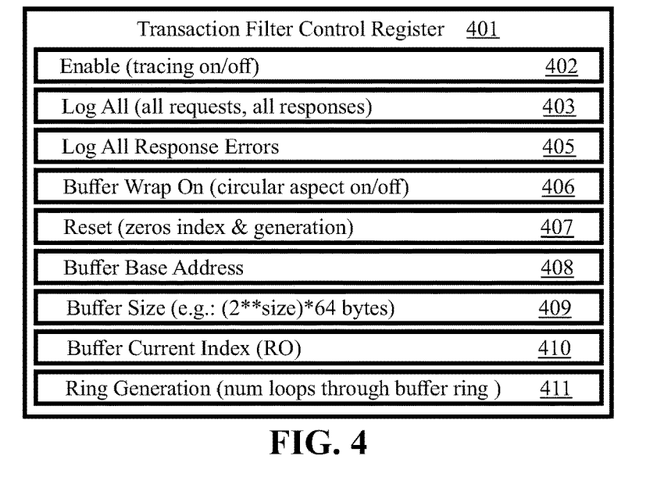
FIG. 4 illustrates an exemplary transaction filter control register according to some aspects.

FIG. 4 illustrates an exemplary transaction filter control register 401 according to some aspects. An enable bit 402 can enable or disable the transaction filter circuit. When disabled, the transaction filter circuit passes through all transactions without monitoring or logging. When the log all bit 403 is set, all the transactions passing through the transaction filter are logged to the transaction log buffer. When the log all response errors bit 405 is set, a log entry is stored for each transaction receiving an error response. When the buffer wrap on bit 406 is set, the transaction log buffer is a circular buffer, otherwise it is not. When the reset bit 407 is set, the transaction buffer can zero values such as the transaction Id, the current index 410 into the transaction log buffer, and the ring generation 411. The buffer base address 408 is the address in memory where the transaction filter's transaction log buffer begins. The buffer size 409 indicates the size of the transaction log buffer. The buffer current index 410 indicates the current location at which log entries are stored in the transaction buffer log. The buffer current index 410 can be incremented every time a log entry is written until the last entry (indicated by buffer size 409) is written at which time logging may stop or may loop back to the start of the buffer if the buffer is a circular buffer. Ring generation 411 can count the number of times that the logging functions loop through the transaction log buffer (assumes circular buffer). For example, ring generation can increment each time buffer current index returns to zero. If ring generation 411 is a single bit, then it simply toggles each time the buffer current index returns to zero.

Figure 5:
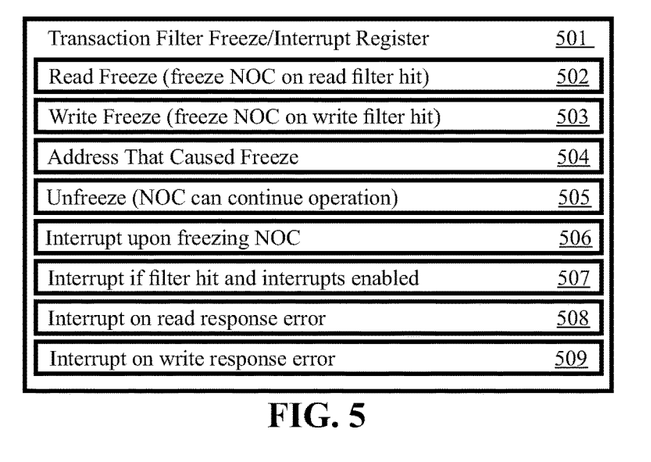
FIG. 5 illustrates an exemplary transaction filter freeze/interrupt register according to some aspects.

FIG. 5 illustrates an exemplary transaction filter freeze/ interrupt register 501 according to some aspects. When read freeze 502 is set, the transaction filter can freeze the NOC 102 when a filter pattern is matched by a read transaction. When the write freeze 503 is set, the transaction filter can freeze the NOC 102 when a filter pattern is matched by a write transaction. The address that caused the freeze can be held 504. The NOC can continue operation when unfreeze 505 is set. When the "interrupt upon freezing NOC" bit 506 is set, the transaction filter can raise an interrupt upon freezing the NOC. An interrupt can signal a host computer to interrogate the ASIC to diagnose an interrupt or NOC freeze and to unfreeze the NOC. When the "interrupt if filter hit and interrupts enabled" bit 507 is set, the transaction filter can surface an interrupt every time a filter pattern matches a transaction while interrupts are enabled. When the "interrupt on read response error" bit 508 is set, the transaction filter can surface an interrupt every time a read transaction results in an error response. When the "interrupt on write response error" bit 509 is set, the transaction filter can surface an interrupt every time a write transaction results in an error response.

Figure 6:
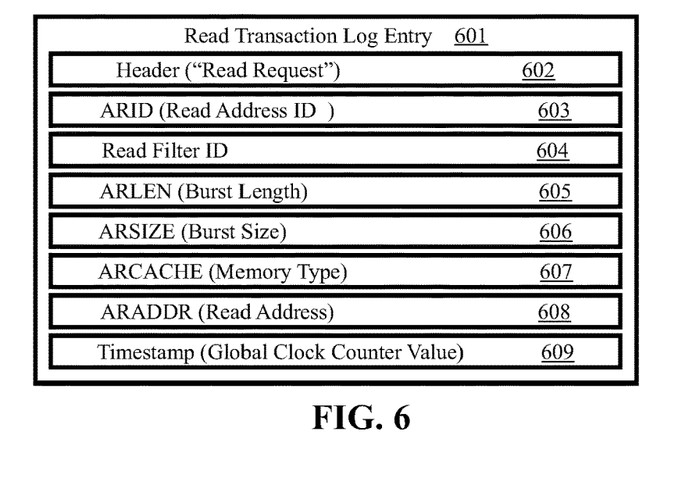
FIG. 6 illustrates an exemplary read transaction log entry according to some aspects.

FIG. 6 illustrates an exemplary read transaction log entry 601 according to some aspects. The read transaction log entry 601 can have a header 602 identifying the log entry type ("read request"), ARID 603, the read filter Id 604, ARLEN 605, ARSIZE 606, ARCACHE 607, ARADDR 608, and a timestamp 609. ARID 603 can be the read address Id. The AXI specification defines ARID 603 as the identification tag for the read address group of signals. The read filter Id 604 can indicate which filter pattern was matched such that the log entry was stored. ARLEN 605 can be the burst length. The AXI specification defines ARLEN 605 as indicating the exact number of transfers in a burst. ARSIZE 606 can be the burst size. The AXI specification defines ARSIZE 606 as indicating the size of each transfer in the burst. ARCACHE 607 can indicate a memory type. The AXI specification defines ARCACHE 607 as indicating how transactions are required to progress through a system. ARADDR 608 can be the read address. The AXI specification defines ARADDR 608 as the address of the first transfer in a read burst transaction. The timestamp 609 can be a count of clock cycles as discussed above with respect to clock counter 311.

Figure 7:
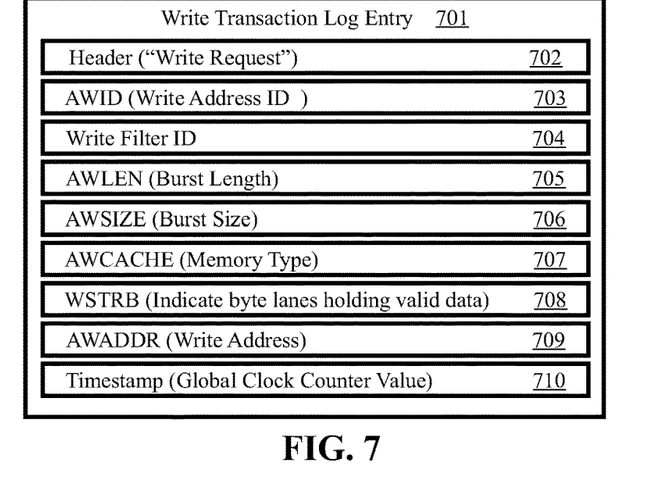
FIG. 7 illustrates an exemplary write transaction log entry according to some aspects.

FIG. 7 illustrates an exemplary write transaction log entry 701 according to some aspects. The write transaction log entry 701 can have a header 702 identifying the log entry type ("write request"), AWID 703, the write filter Id 704, AWLEN 705, AWSIZE 706, AWCACHE 707, WSTRB 708, AWADDR 709, and a timestamp 710. AWID 703 can be the write address Id. The AXI specification defines AWID 703 as the identification tag for the write address group of signals. The write filter Id 704 can indicate which filter pattern was matched such that the log entry was stored. AWLEN 705 can be the burst length. The AXI specification defines AWLEN 705 as indicating the exact number of transfers in a burst. AWSIZE 706 can be the burst size. The AXI specification defines AWSIZE 706 as indicating the size of each transfer in the burst. AWCACHE 707 can indicate a memory type. The AXI specification defines AWCACHE 707 as indicating how transactions are required to progress through a system. WSTRB 708 can be the write strobe. The AXI specification defines WSTRB 708 as indicating which byte lanes hold valid data. AWADDR 709 can be the write address. The AXI specification defines AWADDR 709 as the address of the first transfer in a write burst transaction. The timestamp 710 can be a count of clock cycles as discussed above.

Figure 8:
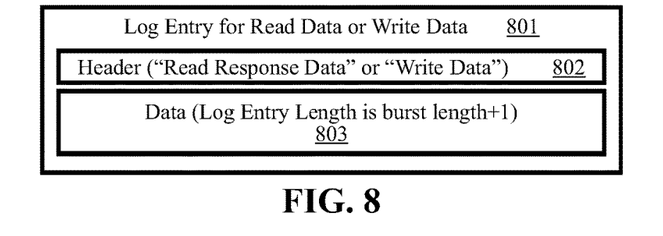
FIG. 8 illustrates an exemplary log entry for read data or write data according to some aspects.

FIG. 8 illustrates an exemplary log entry 801 for read data or write data according to some aspects. The read/write data transaction log entry 801 can have a header identifying the log entry type ("write data" or "read data") 802, and the data written or read 803. The length of the log entry can be the length of the data written (ARLEN or AWLEN) plus one.

Figure 9:
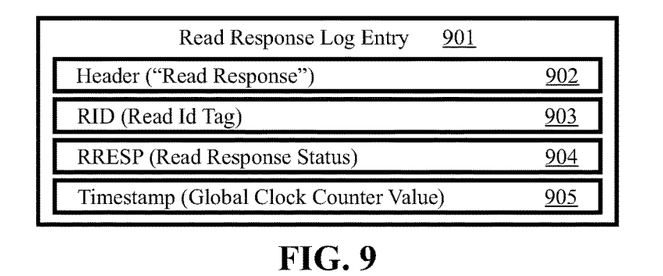
FIG. 9 illustrates an exemplary read response log entry according to some aspects.

FIG. 9 illustrates an exemplary read response log entry 901 according to some aspects. The read response log entry 901 can have a header 902 identifying the log entry type ("read response"), RID 903, RRESP 904, and a timestamp 905. RID 903 can be the read data tag. The AXI specification defines RID 903 as the identification tag for the read data group of signals generated by the responder. RRESP 904 can be the read response. The AXI specification defines RRESP 904 as indicating the status of the read transfer. The timestamp 905 can be a count of clock cycles as discussed above.

Figure 10:
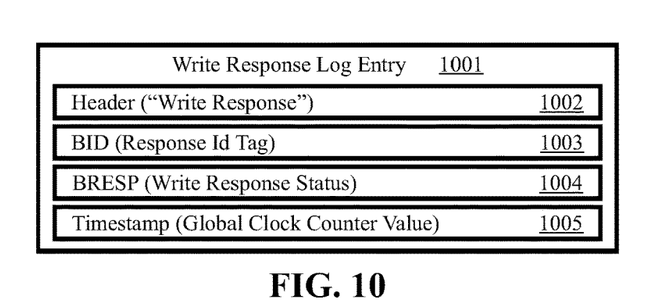
FIG. 10 illustrates an exemplary write response log entry according to some aspects.

FIG. 10 illustrates an exemplary write response log entry 1001 according to some aspects. The write response log entry 1001 can have a header 1002 identifying the log entry type ("write response"), BID 1003, BRESP 1004, and a timestamp 1005. BID 1003 can be the write data tag. The AXI specification defines BID 1003 as the identification tag for the write response. BRESP 1004 can be the write response. The AXI specification defines BRESP 1004 as indicating the status of the write transaction. The timestamp 1005 can be a count of clock cycles as discussed above.

Figure 11:
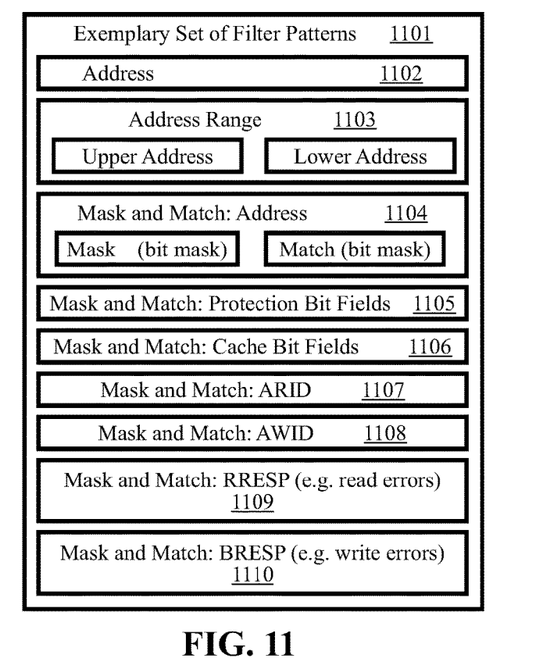
FIG. 11 illustrates an exemplary set of filter patterns according to some aspects.

FIG. 11 illustrates an exemplary set of filter patterns 1101 according to some aspects. The filter pattern can be an address filter pattern 1102 that is matched when a transaction address (e.g. ARADDR or AWADDR) exactly matches the address filter pattern 1102. The filter pattern can be an address range filter pattern 1103 that is matched when a transaction address is within a range from a lower address to an upper address. The filter pattern can be a mask and match address filter pattern 1104 that is matched when the transaction address equals the match pattern after being masked by a mask pattern. The mask and the match can be bit fields.

The filter pattern can be a mask and match protection bit field pattern 1105 that is matched when the transaction protection bit field equals the match pattern after being masked by a mask pattern. The AXI specification defines the protection bit fields for write and read transactions as AWPROT and ARPROT respectively. AWPROT and ARPROT are described as signals indicating the privilege and security level of the transaction, and whether the transaction is a data access or an instruction access. The filter pattern can be a mask and match cache bit field pattern 1106 that is matched when the transaction cache bit field equals the match pattern after being masked by a mask pattern. The AXI specification defines the cache bit fields for write and read transactions as AWCACHE and ARCACHE respectively. AWCACHE and ARCACHE are described as signals indicating how transactions are required to progress through a system.

The filter pattern can be a mask and match read address id pattern 1107 that is matched when the transaction read address id field equals the match pattern after being masked by a mask pattern. The AXI specification defines the read address id bit field as ARID, which is described above. The filter pattern can be a mask and match write address id pattern 1108 that is matched when the transaction write address id field equals the match pattern after being masked by a mask pattern. The AXI specification defines the write address id bit field as AWID, which is described above.

The filter pattern can be a mask and match read response field pattern 1109 that is matched when the transaction read response field equals the match pattern after being masked by a mask pattern. The AXI specification defines the read response field as RRESP, which is described above. The filter pattern can be a mask and match write response field pattern 1110 that is matched when the transaction write response field equals the match pattern after being masked by a mask pattern. The AXI specification defines the write response field as BRESP, which is described above.

Figure 12:
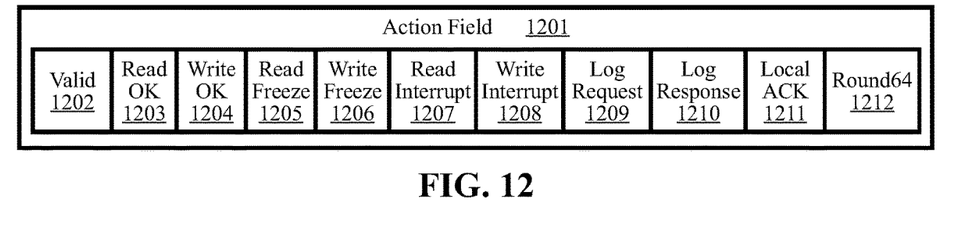
FIG. 12 illustrates an exemplary action field for a filter-action table according to some aspects.
Figure 13:
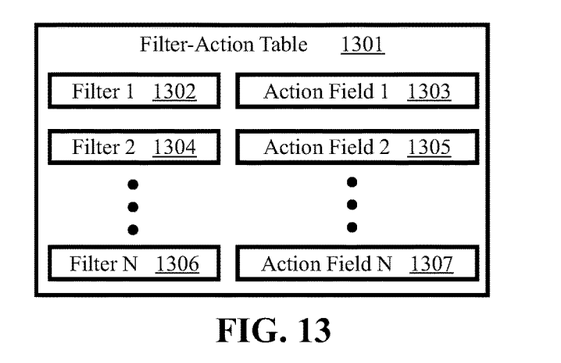
FIG. 13 illustrates an exemplary filter-action table according to some aspects.

FIG. 12 illustrates an exemplary action field 1201 for a filter-action table 1301 according to some aspects. Filter patterns in the filter-action table can be associated with action fields. When a transaction matches a filter pattern, the associated action field 1201 indicates what the transaction filter is to do with the transaction. The action field 1201 can be a bit pattern that indicates actions to be taken. The action field can have a valid bit 1202 indicating if the associated filter pattern is valid. Invalid filter patterns may be ignored by the transaction filter circuit. The action field can have a read OK bit 1203. Read transactions matching the associated filter pattern are allowed through the filter when the read OK bit 1203 is set. The action field can have a write OK bit 1204. Write transactions matching the associated filter pattern are allowed through the filter when the write OK bit 1204 is set. The action field can have a read freeze bit 1205. The transaction filter can freeze the NOC when a read transaction matches the associated filter pattern and the read freeze bit 1205 is set.

The action field can have a write freeze bit 1206. The transaction filter can freeze the NOC when a write transaction matches the associated filter pattern and the write freeze bit 1206 is set. The action field can have a read interrupt bit 1207. The transaction filter can raise an interrupt when a read transaction matches the associated filter pattern and the read interrupt bit 1207 is set. The action field can have a write interrupt bit 1208. The transaction filter can raise an interrupt when a write transaction matches the associated filter pattern and the write interrupt bit 1208 is set. The action field can have a log request bit 1209. The transaction filter can log a transaction request when a transaction matches the associated filter pattern and the log request bit 1209 is set.

The action field can have a log response bit 1210. The transaction filter can log a transaction response when a transaction matches the associated filter pattern and the log response bit 1210 is set. The action field can have a local ACK bit 1211. The transaction filter can acknowledge a transaction when a transaction matches the associated filter pattern and the local ACK bit 1211 is set. For example, the transaction filter 300 can discard a transaction (read OK or write OK not set) and can acknowledge the transaction to the monitored circuit 320 as if the transaction were successful. The action field can have a round64 bit 1212. The transaction filter can round the size of write transactions to the size of a full cache line (e.g. 64 bytes) when a transaction matches the associated filter pattern and the round64 bit 1212 is set.

FIG. 13 illustrates an exemplary filter-action table 1301 according to some aspects. A filter action table associates filter patterns with action fields. FIG. 11 describes a set of filter patterns that can be associated with action fields 1201. Filter 1 1302 is associated with action field 1 1303. Filter 2 1304 is associated with action field 2 1305. Filter N 1306 is associated with action field N 1307. A transaction can be compared against each filter pattern in turn. The transaction filter can take the actions indicated by the action field associated with the first filter pattern matching the transaction.

Figure 14:
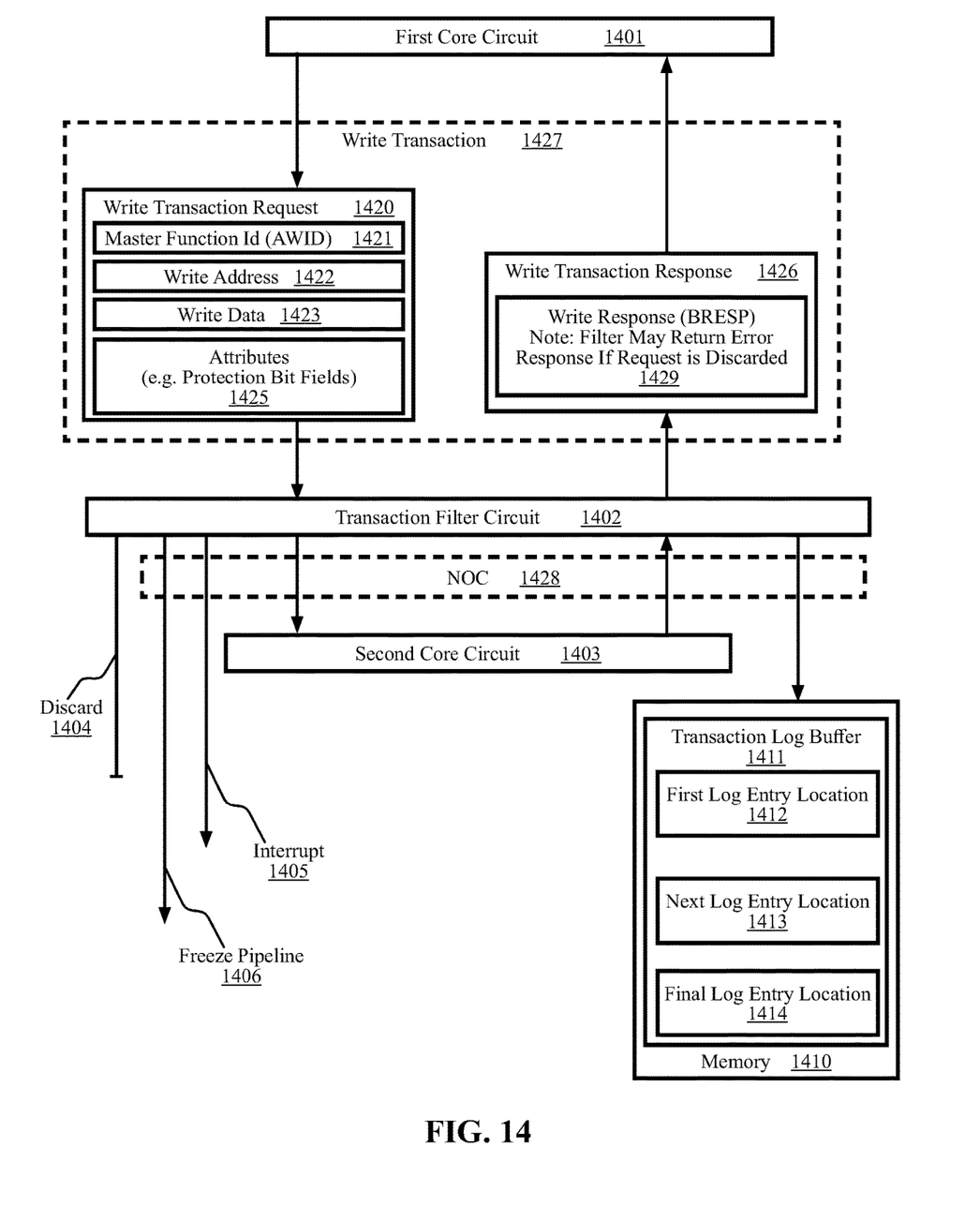
FIG. 14 illustrates a write transaction monitored by a transaction filter circuit according to some aspects.

FIG. 14 illustrates a write transaction 1427 monitored by a transaction filter circuit 1402 according to some aspects. A first core circuit 1401 initiates the write transaction 1427 by issuing a write transaction request 1420 to a second core circuit 1403 via the NOC 1428. The write transaction request 1420 must pass through a transaction filter 1402 before the NOC 1428 delivers it to the second core circuit 1403. The transaction filter 1402 can execute one of a set of actions in response to detecting that the write transaction request matches one of the transaction filter's filter patterns. Those actions include discarding 1404 the transaction request, raising an interrupt 1405, freezing the packet processing pipeline 1406, freezing the NOC, logging the transaction request to a transaction log buffer 1411 in memory 1410, etc. The transaction filter may access the memory 1410 via the NOC 1428 and a memory interface 115. The transaction log buffer can be a continuous section of memory having a number of locations for storing log entries. A first log entry location 1412 can be located as indicated by the buffer base address 408. The final log entry location 1414 can be located at an offset from the first location as indicated by the buffer size 409. The next entry location 1413 can be located at an offset from the first location as indicated by the buffer current index 410.

The write transaction request 1420 can include a master function Id 1421 (e.g. the AXI defined AWID), a write address 1422 (e.g. the AXI defined AWADDR), write data 1423 (e.g. the AXI defined WDATA), and attributes 1425 (e.g. the AXI defined AWPROT, AWCACHE, WSTRB, . . . ). The second core circuit can respond to the write transaction request 1420 with a write transaction response 1426. The write transaction response 1426 can include a write response 1429 (e.g. the AXI defined BRESP). As with the write transaction request 1420, the write transaction response 1426 passes through the transaction filter 1402. As such, the transaction filter can act on the write transaction response 1426 by, for example, logging the response.

Figure 15:
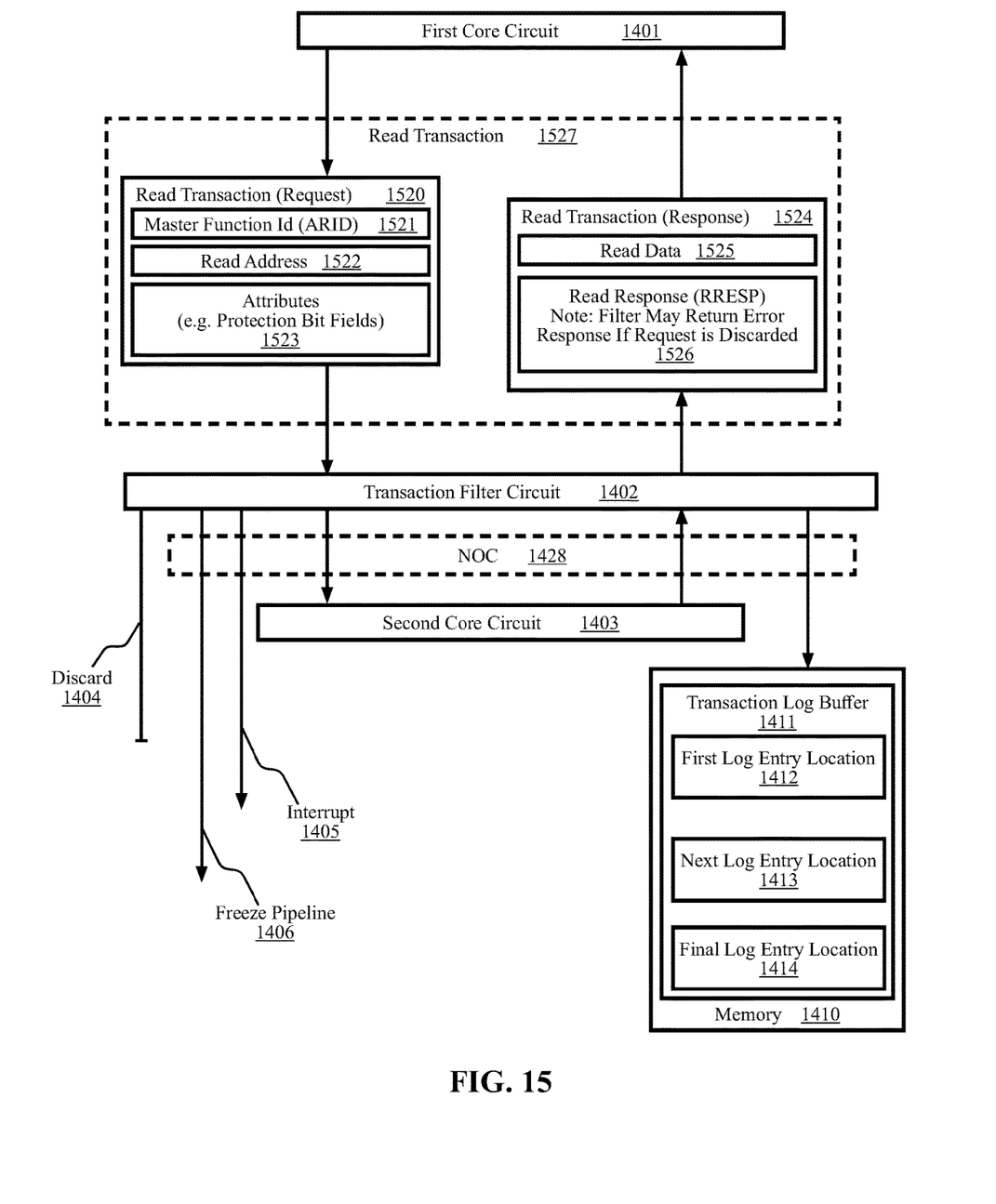
FIG. 15 illustrates a read transaction monitored by a transaction filter circuit according to some aspects.

FIG. 15 illustrates a read transaction 1527 monitored by a transaction filter circuit 1402 according to some aspects. A first core circuit 1401 initiates the read transaction 1527 by issuing a read transaction request 1520 to a second core circuit 1403 via the NOC 1428. The read transaction request 1520 must pass through the transaction filter 1402 before the NOC 1428 delivers it to the second core circuit 1403. The transaction filter 1402 can execute one of a set of actions in response to detecting that the read transaction request matches one of the transaction filter's filter patterns. Those actions include discarding 1404 the transaction request, raising an interrupt 1405, freezing the packet processing pipeline 1406, freezing the NOC, logging the transaction request to a transaction log buffer 1411 in memory 1410, etc.

The read transaction request 1520 can include a master function Id 1521 (e.g. the AXI defined ARID), a read address 1522 (e.g. the AXI defined ARADDR), and attributes 1523 (e.g. the AXI defined AWRROT, ARCACHE, . . . ). The second core circuit 1403 can respond to the read transaction request 1520 with a read transaction response 1524. The read transaction response 1524 can include read data 1525 (e.g. the AXI defined RDATA) and a read response 1526 (e.g. the AXI defined RRESP). As with the read transaction request 1520, the read transaction response 1524 passes through the transaction filter 1402. As such, the transaction filter can act on the read transaction response 1524 by, for example, logging the response.

Figure 16:
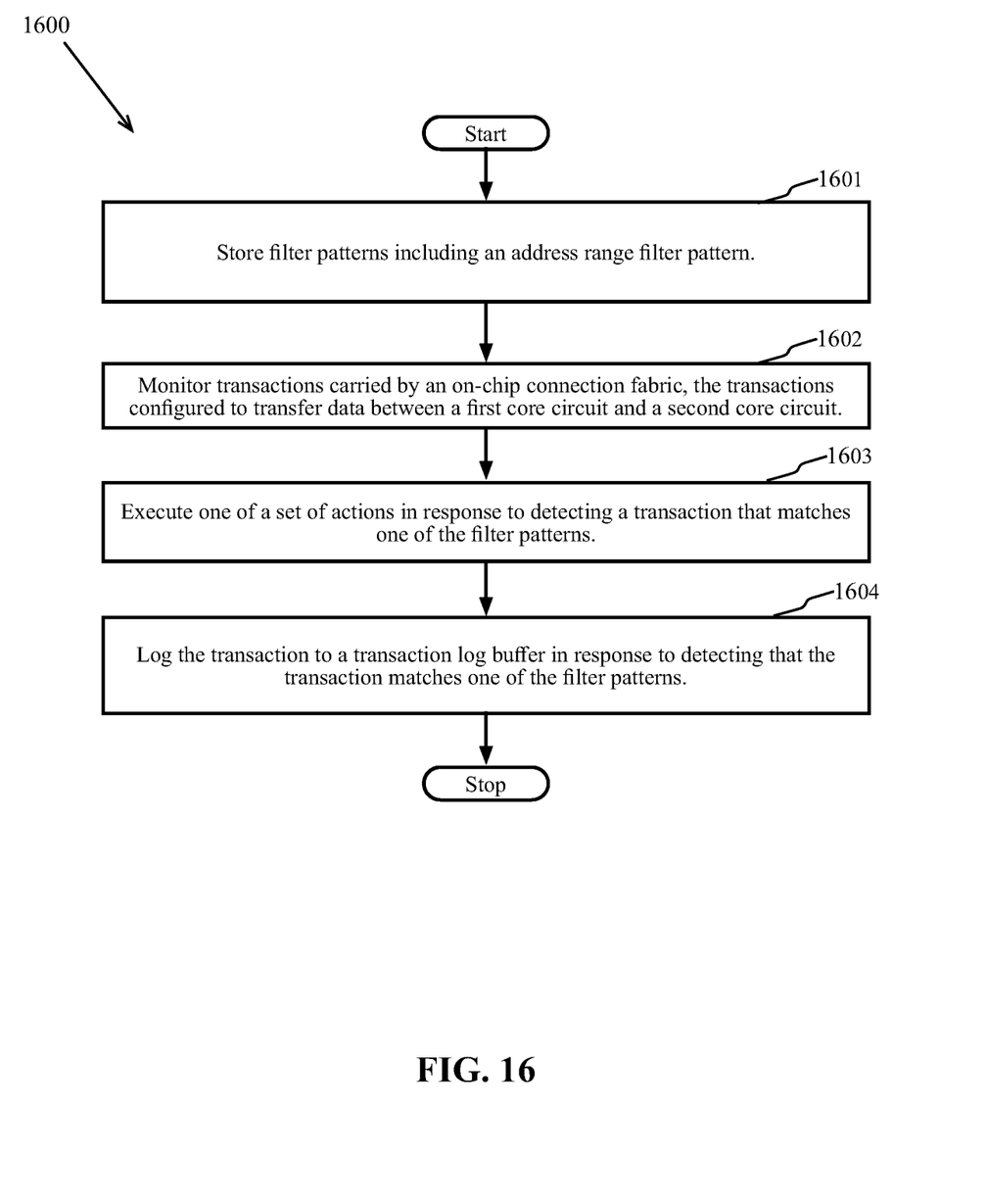
FIG. 16 illustrates a method for transaction filters according to some aspects.

FIG. 16 illustrates a method for transaction filters 1600 according to some aspects. At block 1601, the method can store filter patterns including an address range filter pattern. At block 1602, the method can monitor transactions carried by an on-chip connection fabric, the transactions configured to transfer data between a first core circuit and a second core circuit. At block 1603, the method can execute one of a set of actions in response to detecting a transaction that matches one of the filter patterns. At block 1604, the method can log the transaction to a transaction log buffer in response to detecting that the transaction matches one of the filter patterns.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method for communications within a semiconductor chip, the method comprising:
   storing filter patterns including an address range filter pattern;
   using an on-chip communications fabric to carry transactions from a first core circuit to a second core circuit;
   using a transaction filter located between the first core circuit and the on-chip communications fabric to monitor transactions carried by the on-chip communications fabric between the first core circuit and the second core circuit;
   executing, by the transaction filter, one of a set of actions in response to detecting a transaction that matches one of the filter patterns; and
   logging the transaction to a transaction log buffer in response to detecting that the transaction matches one of the filter patterns.

2. The method of claim 1, wherein one of the filter patterns includes a bit mask.

3. The method of claim 1, wherein the set of actions include discarding the transaction and returning an error responsive to the transaction.

4. The method of claim 1, wherein the on-chip communications fabric is configured to carry write transactions via a write address circuit, a write data circuit, and a write response circuit, and wherein the on-chip communications fabric is configured to carry read transactions via a read address circuit and a read response circuit.

5. The method of claim 1, wherein the set of actions include incrementing a transaction counter that is configured to be read via the on-chip communications fabric.

6. The method of claim 1, wherein the set of actions include interrupting a CPU.

7. The method of claim 1, wherein the filter patterns include a master function Id filter pattern.

8. The method of claim 1, wherein the filter patterns include a transaction attribute filter pattern.

9. The method of claim 1 wherein the filter patterns include an error status filter pattern.

10. A semiconductor chip comprising:
    a first core circuit;
    a second core circuit;
    an on-chip communications fabric that carries transactions from the first core circuit to the second core circuit; and
    a transaction filter circuit located between the first core circuit and the on-chip communications fabric and communicatively coupled to the first core circuit and the on-chip communications fabric, wherein the transaction filter circuit is configured to:
    monitor transactions passing between the first core circuit and the second core circuit,
    execute one of a set of actions in response to detecting a transaction that matches one of a plurality of filter patterns, and
    log a transaction to a transaction log buffer in response to detecting that the transaction matches one of the filter patterns.

11. The semiconductor chip of claim 10, wherein the filter patterns include an address range filter pattern.

12. The semiconductor chip of claim 10, wherein one of the filter patterns includes a bit mask.

13. The semiconductor chip of claim 10, wherein the set of actions include discarding the transaction and returning an error responsive to the transaction.

14. The semiconductor chip of claim 10, wherein the on-chip communications fabric is configured to carry write transactions via a write address circuit, a write data circuit, and a write response circuit, and wherein the on-chip communications fabric is configured to carry read transactions via a read address circuit and a read response circuit.

15. The semiconductor chip of claim 10, wherein the set of actions include incrementing a transaction counter that is configured to be read via the on-chip communications fabric.

16. The semiconductor chip of claim 10, wherein the set of actions include interrupting a CPU, and the set of actions include freezing a packet processing pipeline circuit.

17. The semiconductor chip of claim 10, wherein the filter patterns include a master function Id filter pattern.

18. The semiconductor chip of claim 10, wherein the filter patterns include a transaction attribute filter pattern.

19. The semiconductor chip of claim 10, wherein the filter patterns include an error status filter pattern.

20. A semiconductor chip comprising:
    a first core circuit;
    a second core circuit;
    a communications means for carrying a transaction from the first core circuit to the second core circuit,
    a filtering means for determining that the transaction meets a criterion;
    a means for executing a means for reacting to the transaction meeting the criterion; and
    a means for blocking the transaction if and only if the means for reacting to the transaction meeting the criterion to prevents passing the transaction,
    wherein the filtering means is located between the first core circuit and the communications means.

* * * * *